Jan. 13, 1970     E. SCHNITTJER     3,489,430

THREE-POINT TANDEM HITCH

Filed July 31, 1967

INVENTOR
EDWARD SCHNITTJER
BY
*Deck, Zarley, McKee & Thomte*
ATTORNEYS 3,489,430
THREE-POINT TANDEM HITCH
Edward Schnittjer, R.R., Clarion, Iowa 50525
Filed July 31, 1967, Ser. No. 657,131
Int. Cl. B60d 1/00, 1/14
U.S. Cl. 280—411    4 Claims

ABSTRACT OF THE DISCLOSURE

A three-point tandem hitch which includes a first frame means which is adapted to be detachably connected to a tractor three-point hitch and which extends rearwardly therefrom. A second frame means is rotatably secured to the rearward end of the first frame means and a cross frame member extends outwardly of both sides of the second frame means. The opposite ends of the cross frame member are adapted to be detachably connected to a trailing implement so that the hitch may be used to pull at least two farm implements such as corn planters or the like.

---

The farm tractors that are available today are extremely powerful and are able to pull extremely heavy equipment. It is desirable to pull a plurality of corn planters in a tandem arrangement so that the planting operation will be efficiently and quickly completed. However, it has heretofore been non-conveniently possible to connect at least two corn planters or the like in a side by side fashion.

Therefore, it is a principal object of this invention to provide a tandem hitch to permit pulling of at least two trailing implements.

A further object of this invention is to provide a three-point tandem hitch which is adapted to be detachably connected to a three-point hitch system of a tractor so that the forward end of the tandem hitch may be raised or lowered.

A further object of this invention is to provide a three-point tandem hitch including first and second frame members which are rotatably connected together to provide the unit with the greatest amount of maneuverability and versatility.

A further object of this invention is to provide a three-point tandem hitch which permits the tractor to be turned sharply.

A further object of this invention is to provide a three-point tandem hitch which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 5 is a top view illustrating the hitch as it is connected to a tractor and being connected to a pair of corn planters or the like.

Figures 1, 2:
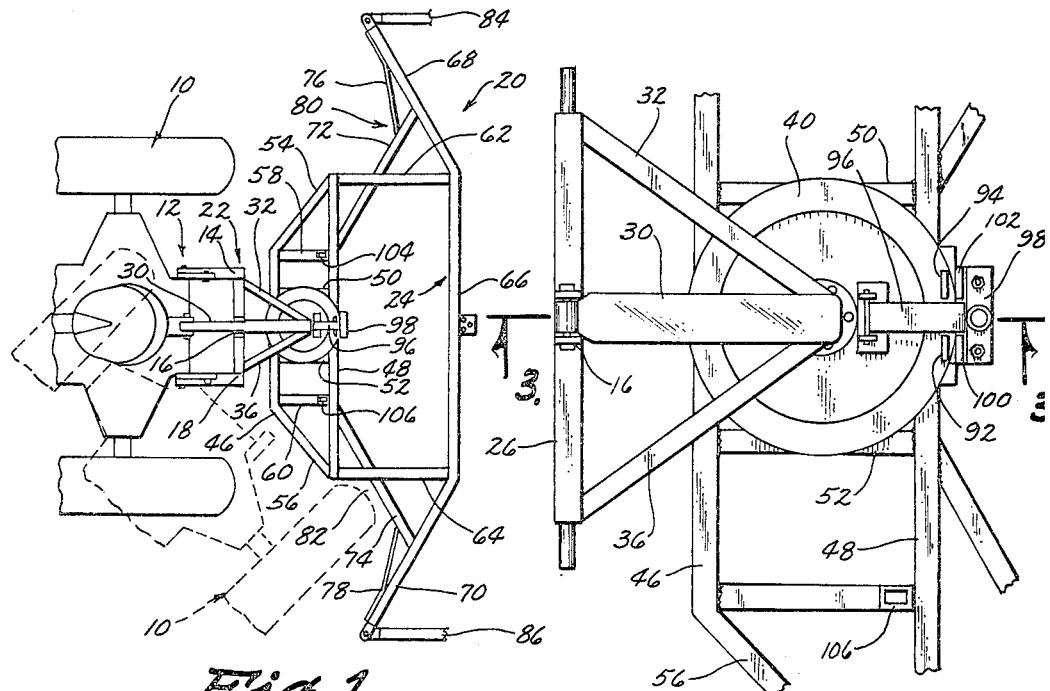
FIG. 1 is a top view of the hitch as it is connected to a tractor, only the rearward end of the tractor being shown.
FIG. 2 is a fragmentary top view of the hitch.

The numeral 10 generally designates a conventional tractor equipped with a three-point hitch 12 which is hydraulically operated and which includes three hitch connectors 14, 16 and 18. The hitch of this invention is generally designated by the reference numeral 20 and includes a frame means 22 which is rotatably connected about a vertical axis to frame means 24.

Figures 3, 4:
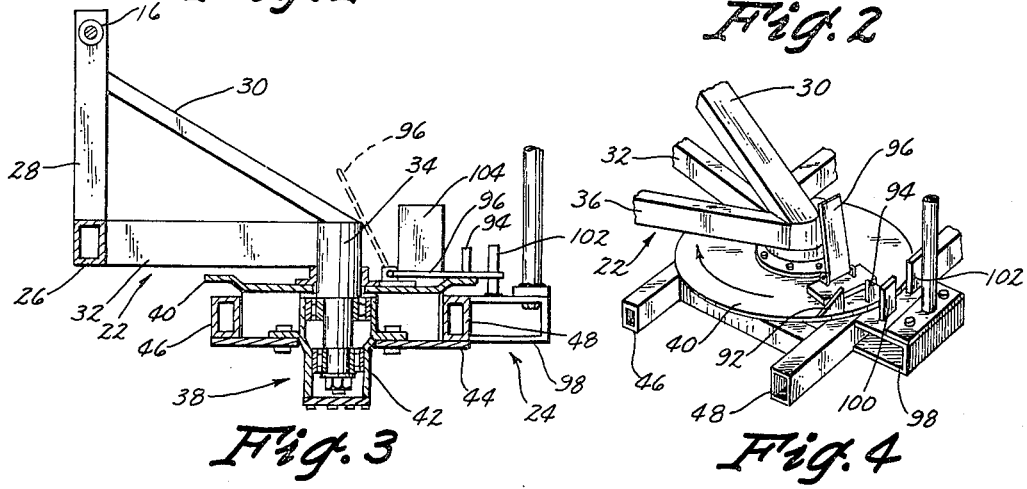
FIG. 3 is a sectional view as would be seen on line 3—3 of FIG. 2.
FIG. 4 is a fragmentary perspective view of a rotatable hub portion of the hitch.
Figure 5:
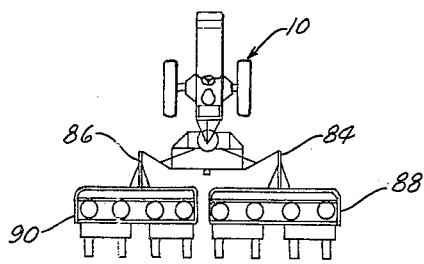

Frame means 22 is comprised of a bar member 26, the opposite ends of which are detachably connected to hitch connectors 18 and 22. An upstanding post 28 is secured to bar 26 and extends vertically upwardly therefrom as best seen in FIG. 3. The upper end of post 28 is detachably pivotally connected to connector 16. A brace 30 is welded to post 28 and extends downwardly and rearwardly therefrom as best illustrated in FIG. 3. A brace 32 is welded to bar 26 adjacent one end thereof and extends rearwardly to a spindle 34 to which it is welded. Likewise, a brace 36 is secured to and extends between bar 26 adjacent the other end thereof and spindle 34. The lower end of brace 30 is also welded to spindle 34.

Frame means 22 is rotatably connected about a vertical axis to frame means 24 by means of a conventional truck hub means 38 of which spindle 34 is an integral part. Hub means 38 includes an upper plate portion 40 which is welded to spindle 34. A housing 42 is rotatably mounted on the lower end of spindle 34 in conventional fashion and has a flange 44 extending radially outwardly therefrom as best seen in FIG. 3. A frame member 46 is welded or otherwise secured to the forward portion of the flange 44 and extends outwardly from both sides thereof as best illustrated in FIG. 2. A frame member 48 is welded or otherwise secured to the rearward end of flange 44 and extends outwardly therefrom in a manner best illustrated in FIG. 2. A pair of braces 50 and 52 are secured to opposite sides of flange 44 and are welded at their rearward and forward ends to frame members 46 and 48 as illustrated in FIG. 2. Frame member 46 includes outwardly and rearwardly extending end portions 54 and 56 which are welded to the outer ends of frame member 48 as illustrated in FIG. 1. A pair of braces 58 and 60 are welded to and extend between frame members 46 and 48 in the manner illustrated in FIG. 1.

Frame members 62 and 64 are secured to the opposite ends of frame member 48 by welding or the like and extend rearwardly therefrom. A transverse cross member 66 is welded to the rearward ends of frame members 62 and 64 and includes outwardly and forwardly extending end portions 68 and 70. A brace 72 is secured to end portion 68 intermediate the length thereof and extends forwardly and inwardly therefrom and has its forward end welded to frame member 48 inwardly of frame member 62 as illustrated in FIG. 1. A brace 74 is welded at its rearward end to end portion 70 intermediate the length thereof and extends forwardly and inwardly therefrom and has its inner end welded to frame member 48 inwardly of frame member 64 as illustrated in FIG. 1. Brace 72 is also welded to frame member 62 at the intersection thereof. Brace 74 is welded to frame member 64 at the intersection thereof. A reinforcing brace 76 extends between brace 72 and end portion 68 while the reinforcing brace 78 extends between brace 74 and end portion 70. The relationship of frame members 62, brace 72 and reinforcing brace 76 defines a wheel receiving portion 80 while the relationship of frame member 64, brace 74 and reinforcing brace 78 defines a wheel receiving area 82.

The outer ends of end portions 68 and 70 are adapted to be detachably connected to the tongues 84 and 86 of corn planters 88 and 90 respectively. Plate 40 is provided with a pair of spaced apart upstanding ear members 92 and 94 which are adapted to receive therebetween a bar 96 which is pivotally connected to the upper end of plate 40 as illustrated in FIG. 4. A bracket 98 is secured to frame member 48 and extends rearwardly therefrom and has a pair of spaced apart upstanding ear members 100 and 102 secured thereto. Thus, rotation between frame members 22 and 24 can be prevented when ear members 92, 94 and 100, 102 are aligned and bar 96 is pivoted downwardly so that it is received between the respective ears as illustrated in FIG. 3. When bar member 96 is pivoted to its upper position, frame means 24 is free to rotate with respect to frame means 22 and this relationship is illustrated in FIG. 4.

In operation, frame means 22 would be connected to the three-point hitch of the tractor in conventional fashion and the operation of the tractor hitch would cause the hitch 20 to be raised or lowered therewith. The tractor is then maneuvered to facilitate the attachment of the corn planters 88 and 80 to the outer ends of end portions 68 and 70 and the various hydraulic hoses, etc. would then be connected to the tractor. Normally, bar 96 would be in a position seen in FIG. 4 to permit the free pivotal movement of frame means 24 with respect to frame means 22. Thus, the tractor can be turned sharply and frame means 22 will rotate about hub means 38 to provide the tractor with the utmost maneuverability. As seen in FIG. 1, the design of the hitch permits the rear wheels of the tractor to be received by one of the wheel receiving areas 80 or 82 so that the tractor can be turned sharply with respect to the hitch. Obviously, when it is desired to limit the rotational movement of frame means 24 with respect to frame means 22, it is simply necessary to cause bar 96 to be received between the ear members 92, 94 and 100, 102.

The fact that the hitch 20 is raised or lowered with the three-point hitch of the tractor makes it extremely versatile in that the hitch 20 may be raised should the tractor encounter soft mud or the like which would normally cause the hitch 20 to be dragged through the mud. When the tractor does encounter the soft mud or the like it is simply necessary to raise the hitch 20 by means of the tractor three-point hitch which will prevent the hitch 20 from entering the mud. It is obvious that the extreme width of hitch 20 would make it very difficult for any tractor to pull the same through mud or the like if the hitch were to engage the same. With the invention disclosed herein, the hitch 20 need never engage the ground regardless of the soil conditions. The structural configuration of the hitch 20 provides an extremely durable hitch which will pose a minimum of maintenance problems.

A pair of spaced apart bumpers 104 and 106 extend upwardly from braces 58 and 60 and are adapted to limit the rotation of frame means 22 with respect to frame means 20. Bar 96 would be pivoted downwardly into a locked position to prevent rotation of frame means 22 with respect to frame means 20 for transporting operations.

Thus it can be seen that the hitch accomplishes at least all of its stated objectives.

Some changes may be made in the construction and arrangement of my three-point tandem hitch without departing from the real spirit and purpose of my invention, and it is my intention to cover by my claims, any modified forms of structure or use of mechanical equivalents which may be reasonably included within their scope.

I claim:
1. In a tandem hitch for use with a tractor having a multiple-point hitch assembly vertically movably mounted at the rearward end thereof, the hitch assembly having first and second horizontally spaced apart hitch points and a third hitch point positioned above and between the first and second hitch points, comprising,
   a first frame means adapted to be detachably connected to the tractor hitch assembly, said first frame means including a vertically disposed spindle means having a plurality of support members secured thereto extending forwardly therefrom adapted to be detachably connected to the multiple points of the tractor hitch assembly so that a vertical movement of the tractor hitch assembly will cause said first frame means to be vertically moved,
   and a second frame means selectively rotatably connected about a vertical axis to said spindle means and including a cross frame member extending outwardly of both sides of said first frame means, the outer ends of said cross frame member terminating outwardly of the rear wheels of the tractor, each of the opposite ends of said cross frame member adapted to have a trailing implement detachably connected thereto,
   said first frame means including a horizontal bar member extending between the first and second hitch points, a first brace secured to one end of said bar member and extending rearwardly and inwardly therefrom to said spindle means, a second brace secured to the other end of said bar member and extending rearwardly and inwardly to said spindle means, a post secured to said bar at the center thereof and extending upwardly therefrom for connection with the third hitch point, a third brace secured to said post and extending rearwardly and downwardly to said spindle means, said spindle means extending downwardly from the rearward ends of said first, second and third braces.

2. The device of claim 1 wherein a rotatable hub means is mounted on said spindle means and includes rearward and forward ends and opposite sides, a first frame member secured at its center to the forward end of said hub means and extending outwardly of both sides thereof, a second frame member secured at its center to the rearward end of said hub means and extending outwardly of both sides thereof, said first and second frame members being parallel and being normally transverse to the direction of travel of the tractor, said first frame member having a length less than said second frame member, a third frame member secured to and extending between one end of said first frame member and one end of said second frame member, a fourth frame member secured to and extending between the other end of said first frame member and the other end of said second frame member, fifth and sixth frame members secured to the opposite ends of said second frame member respectively and extending rearwardly therefrom, said cross frame member being secured to and extending between the rearward ends of said fifth and sixth frame members and extending outwardly therefrom.

3. The device of claim 2 wherein the outer ends of said cross frame member extend outwardly and forwardly with respect to said fifth and sixth frame members to define tractor wheel receiving areas therebetween to permit the tractor to be angularly disposed with respect to said second frame means.

4. The device of claim 2 wherein a selective locking means extends between said second frame member and said spindle means to permit rotatable movement between said first and second frame means at times.

References Cited
UNITED STATES PATENTS

| | | | |
|---|---|---|---|
| 2,178,467 | 10/1939 | Brent | 280—412 |
| 2,333,837 | 11/1943 | Wibbels. | |
| 3,269,749 | 8/1966 | Hartwig. | |

FOREIGN PATENTS

| | | |
|---|---|---|
| 743,374 | 1/1956 | Great Britain. |
| 808,218 | 1/1959 | Great Britain. |

LEO FRIAGLIA, Primary Examiner

U.S. Cl. X.R.

172—248; 280—415, 456